United States Patent
Nazzari et al.

(10) Patent No.: US 10,074,075 B2
(45) Date of Patent: *Sep. 11, 2018

(54) SYSTEMS FOR SECURE TRACKING CODE GENERATION, APPLICATION, AND VERIFICATION

(71) Applicant: HURU Systems Ltd., Nassau (BS)

(72) Inventors: Ian A. Nazzari, Moraga, CA (US); Paul Eipper, Corupa (BR)

(73) Assignee: HURU SYSTEMS LTD., Nassau (BS)

( * ) Notice: Subject to any disclaimer, the term of this patent is extended or adjusted under 35 U.S.C. 154(b) by 0 days.

This patent is subject to a terminal disclaimer.

(21) Appl. No.: 15/826,218

(22) Filed: Nov. 29, 2017

(65) Prior Publication Data
US 2018/0089618 A1    Mar. 29, 2018

Related U.S. Application Data

(63) Continuation of application No. 15/664,177, filed on Jul. 31, 2017, now Pat. No. 9,836,720, which is a
(Continued)

(51) Int. Cl.
G06Q 10/08    (2012.01)

(52) U.S. Cl.
CPC .................. *G06Q 10/087* (2013.01)

(58) Field of Classification Search
CPC .................................................... G06Q 10/087
(Continued)

(56) References Cited

U.S. PATENT DOCUMENTS

| 6,148,291 A | 11/2000 | Radican |
|---|---|---|
| 6,422,029 B1 | 7/2002 | Boitnott |

(Continued)

FOREIGN PATENT DOCUMENTS

| JP | 2003072526 A | 3/2003 |
|---|---|---|
| WO | 03038738 A1 | 5/2003 |

OTHER PUBLICATIONS

Trimble Technology Sales Group, "Trimble Technology for Logistics", Accessed on May 6, 2014 at www.trimble.com/tsg/logistics.aspx, 2 page.

(Continued)

*Primary Examiner* — Allyson Trail
(74) *Attorney, Agent, or Firm* — Workman Nydegger

(57) ABSTRACT

Embodiments include a computer-implemented management platform for securely generating tracking codes, and for verifiably imprinting those tracking codes onto physical articles. In an embodiment, one or more hardware processors generate tracking code(s) and send the tracking code(s) towards an automated computer-controlled production line, and which physically imprint each tracking codes onto a corresponding article, and physically verify the physical imprinting. If a tracking code was correctly imprinted on its corresponding article, one or more records are recorded in a durable storage medium, which indicate that the tracking code imprinted on an article. If a tracking code was incorrectly imprinted on its corresponding article, the factory line physically rejects the corresponding article. Embodiments also include the computer-implemented management platform securely managing those physical articles throughout their lifecycle, based on the securely-generated and verifiably-imprinted tracking codes.

18 Claims, 7 Drawing Sheets

Related U.S. Application Data continuation of application No. 14/932,844, filed on Nov. 4, 2015, now Pat. No. 9,741,012.

(60) Provisional application No. 62/075,598, filed on Nov. 5, 2014.

(58) Field of Classification Search
USPC .............. 235/385, 375, 494, 462.1, 462.04
See application file for complete search history.

(56) References Cited

U.S. PATENT DOCUMENTS

| | | |
|---|---|---|
| 6,886,748 B1 | 5/2005 | Moore |
| 7,055,741 B2 | 6/2006 | Bong et al. |
| 7,204,421 B2 | 4/2007 | Austin |
| 7,730,325 B2 | 6/2010 | Morrow et al. |
| 8,141,330 B2 | 3/2012 | Henkel |
| 8,279,067 B2 | 10/2012 | Berger et al. |
| 8,344,879 B2 | 1/2013 | Harmon et al. |
| 8,576,095 B2 | 11/2013 | Harmon et al. |
| 8,666,936 B2 | 3/2014 | Wallace |
| 9,454,746 B2 | 9/2016 | Ozkan |
| 2003/0011474 A1 | 1/2003 | Ng |
| 2003/0195749 A1 | 10/2003 | Schuller |
| 2004/0024644 A1 | 2/2004 | Gui et al. |
| 2004/0113783 A1 | 6/2004 | Yagesh |
| 2006/0189326 A1 | 8/2006 | Black, Sr. et al. |
| 2006/0200391 A1 | 9/2006 | Taylor |
| 2007/0102515 A1 | 5/2007 | Windham et al. |
| 2007/0119954 A1 | 5/2007 | Barenburg et al. |
| 2007/0219916 A1 | 9/2007 | Lucas |
| 2007/0239569 A1 | 10/2007 | Lucas et al. |
| 2008/0093448 A1 | 4/2008 | De La Huerga |
| 2012/0098664 A1 | 4/2012 | Nordin et al. |
| 2012/0145779 A1 | 6/2012 | Bietenbeck et al. |
| 2013/0117078 A1 | 5/2013 | Weik, III et al. |
| 2013/0212398 A1 | 8/2013 | Yeap et al. |
| 2014/0025524 A1 | 1/2014 | Sims et al. |
| 2014/0048593 A1 | 2/2014 | Hoganson |

OTHER PUBLICATIONS

Trimble's New AllTrak System Manages Construction Asset Usage and Reduces Loss, Available as early as Aug. 24, 2009, Accessed May 6, 2014 at http://investor.trimble.com/releasedetail.cfm?ReleaseIDS=404541, 2 pages.
Product Brochure: "Trimble Alltrak; Take Control of Your Assets, Improve Asset Productivity," 2009, 4 pages.
International Search Report from International PCT Application No. PCT/US14/36896, dated Mar. 27, 2015.
International Search Report from International PCT Application No. PCT/US2015/059183 dated Jan. 22, 2016.
Extended European Search Report from EP Application No. EP 15856181.1, dated Feb. 22, 2018.

SYSTEMS FOR SECURE TRACKING CODE GENERATION, APPLICATION, AND VERIFICATION

CROSS-REFERENCE TO RELATED APPLICATIONS

This application is a continuation of U.S. patent application Ser. No. 15/664,177, filed Jul. 31, 2017, and entitled "SYSTEMS FOR SECURE TRACKING CODE GENERATION, APPLICATION, AND VERIFICATION," which is a continuation of U.S. patent application Ser. No. 14/932,844, filed Nov. 4, 2015, and entitled "SYSTEMS FOR SECURE TRACKING CODE GENERATION, APPLICATION, AND VERIFICATION," which application claims priority to, and the benefit of, United States Provisional Patent Application No. 62/075,598, filed Nov. 5, 2014, and entitled "SECURE TRACKING CODE GENERATION, APPLICATION, AND VERIFICATION." The entire contents of each of these publications is incorporated herein by reference in their entireties.

BACKGROUND

In many industries it is desirable to utilize tracking codes, such as serial numbers, to mark and identify articles. Additionally, in many industries, it is desirable to provide and utilize security seals for articles to ensure that the articles remain closed, un-tampered with, or otherwise secured. However, tracking codes and seals are treated separately from each other and differently by each industry, or even by different businesses within the same industry, and are often inefficient and insecure in their use.

SUMMARY

Embodiments described herein relate to systems for secure tracking code generation, application, and verification. In particular, embodiments include a centralized computer-implemented management platform for securely generating tracking codes, and for verifiably imprinting those tracking codes onto physical articles. In some embodiments, the computer-implemented management platform be configured for securely generating tracking codes that are formatted to include group tracking codes and unit tracking codes, and for securely imprinting these tracking codes on physical articles in a secure and verified manner. In some embodiments, the computer-implemented management platform provides for lifecycle management of tracking codes and assets, such as tracking custody of tracking codes, associating tracking codes with assets, and managing field service orders related to the tracking codes, even as the assets/tracking codes pass between different entities.

In an embodiment, a computer system generates, at one or more hardware processors, one or more tracking codes. The computer system sends the one or more tracking codes towards an automated computer-controlled production line, along with one or more first messages which cause the production line to physically imprint, by one or more hardware imprinting units, each of the one or more tracking codes onto a corresponding article. The one or more first messages also cause the production line to physically verify, by one or more hardware verification units, the physical imprinting by the one or more hardware imprinting units of each of the one or more tracking codes onto their corresponding article. The verification includes the one or more hardware verification units performing a machine reading of each of the one or more tracking codes, as imprinted on its corresponding article. The computer system receives at least one result of the verification by the one or more hardware verification units of the physical imprinting of each of the one or more tracking codes onto their corresponding article.

For each of the one or more tracking codes, if the at least one result of the verification indicates that the tracking code was correctly imprinted on its corresponding article, the computer system records, in a durable computer-readable hardware storage medium, one or more records that indicate the tracking code as being imprinted on an article and that initiate a custody chain for the tracking code and the article. Alternatively, if the at least one result of the verification indicates that the tracking code was incorrectly imprinted on its corresponding article, the computer system sends one or more second messages towards the automated computer-controlled production line, causing the one or more hardware verification units to physically reject the corresponding article.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

To further clarify the above and other advantages and features of the present disclosure, a more particular description of the disclosure will be rendered by reference to specific embodiments illustrated in the drawings. It is appreciated that these drawings depict only typical embodiments of the disclosure and are not to be considered limiting of scope, and are not necessarily drawn to scale. The disclosure will be described and explained with additional specificity and detail through the use of the accompanying drawings.

DETAILED DESCRIPTION

Embodiments described herein relate to systems for secure tracking code generation, application, and verification. In particular, embodiments include a centralized computer-implemented management platform for securely generating tracking codes, and for verifiably imprinting those tracking codes onto physical articles. In some embodiments, the computer-implemented management platform be configured for securely generating tracking codes that are formatted to include group tracking codes and unit tracking codes, and for securely imprinting these tracking codes on physical articles in a secure and verified manner. In some embodiments, the computer-implemented management platform provides for lifecycle management of tracking codes and assets, such as tracking custody of tracking codes, associating tracking codes with assets, and managing field service orders related to the tracking codes, even as the assets/tracking codes pass between different entities.

Figure 1:
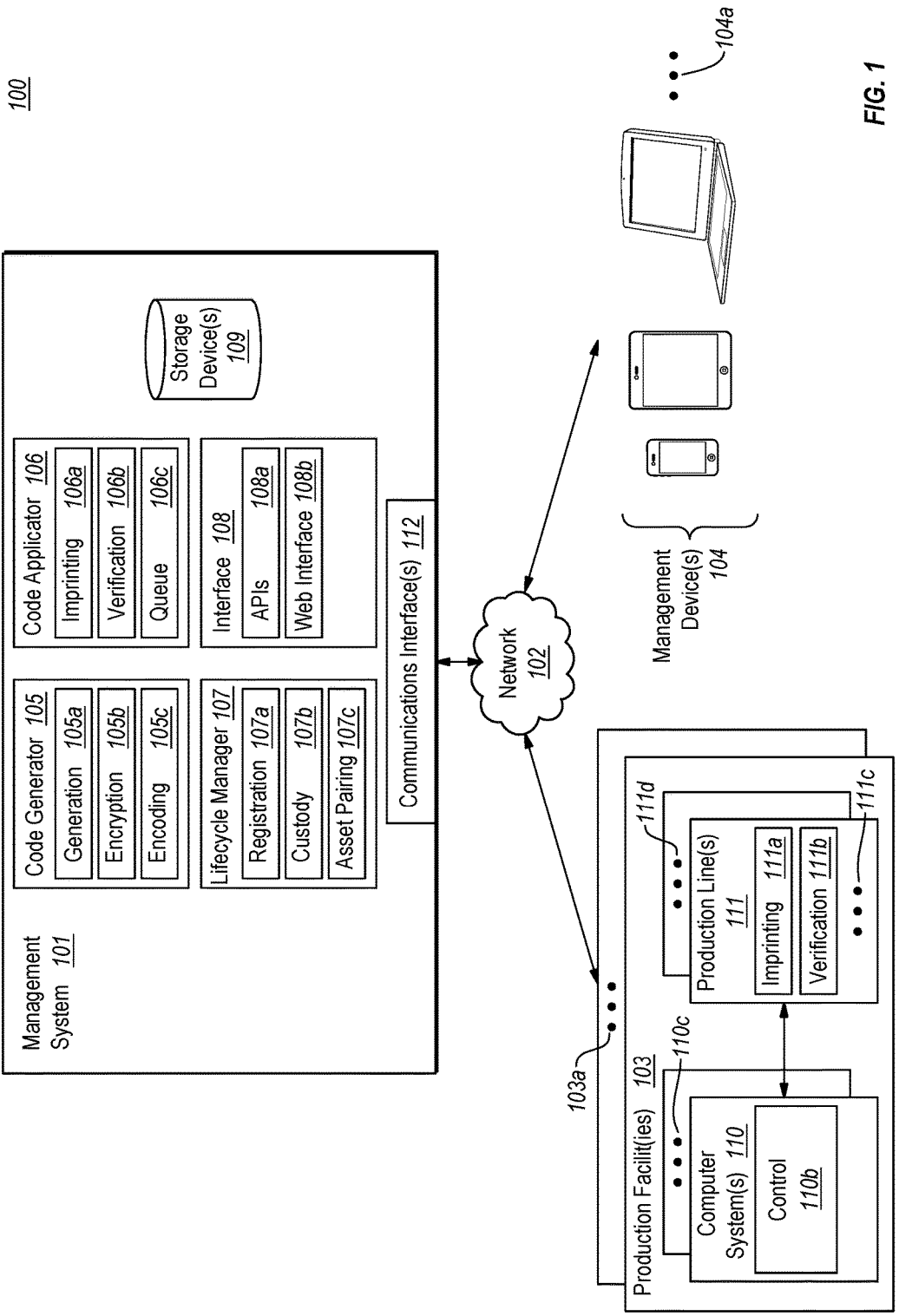
FIG. 1 illustrates an example computing environment for tracking code generation and management.

In view of the foregoing, FIG. 1 illustrates an example computing environment 100 for tracking code generation and management, and in which embodiments described herein may operate. The example computing environment 100 may provide a management platform for securely generating tracking codes, for verifiably imprinting those tracking codes onto physical articles, and for securely managing those physical articles throughout their lifecycle, based on the securely-generated and verifiably-imprinted tracking codes.

As depicted, the computing environment 100 includes a management system 101, which is connected via a network 102 (e.g., a LAN, WAN, and/or the Internet) to a plurality of other computing systems, such as computer system(s) at the production facilit(ies) 103, and such as the depicted management device(s) 104. The ellipses 103a indicate that the management system 101 may communicate with more than one production facility, and the ellipses 104a indicate that the management system 101 may communicate with a variety of management devices (both in number and in type, such as the depicted smartphone, tablet, and laptop computer).

In general, the management system 101 is configured to generate tracking codes configured for tracking individual articles and/or groups of articles, and to manage a lifecycle of those tracking codes (and, by extension, a lifecycle of any articles/groupings associated with those tracking codes). As used herein, an article can comprise virtually any physical item (or groups of items). An article may be an asset (or group of assets), or a tracking unit (or groupings of tracking units) that is (or can be) applied to an asset. As will be appreciated in view of the disclosure herein, the tracking codes described herein, when managed by the management system 101, function as "harmonizing codes" that stay with articles throughout their lifecycles, and that are used to track any desired events associated with those articles (e.g., being passed between individuals; changing geographical location; being applied to and associated with an asset; undergoing maintenance or upgrades; being sold; being stolen, destroyed, lost; etc.).

In an embodiment, the management system 101 generates tracking codes, and communicates (e.g., over the network 102) with one or more computer systems at production facilit(ies) 103 or at least one production facility 103, to cause hardware units of one or more production lines at a production facility 103 to physically imprint those tracking codes onto physical articles, and to verify that the imprinting was performed correctly and legibly. Additionally, the management system 101 communicates (e.g., over the network 102) with a variety of management devices 104 (e.g., associated with production facilities, warehouses, companies, individual end-users, etc.), as part of managing the lifecycle of tracking codes and any associated articles. For instance, one or more management devices 104 may operate with the management system 101 to assign custody of tracking codes (and associated articles) to individuals or to transfer custody between individuals, to check status of a tracking code/article, to change status of a tracking code/article, to apply a tracking code (e.g., tracking unit) to an asset, etc.

To the accomplishment of the foregoing, FIG. 1 depicts that the management system 101 can include a code generator module 105, a code applicator module 106, a lifecycle manager module 107, and an interface module 108. FIG. 1 also illustrates that the management system 101 can include one or more communications interface(s) 112 (e.g., for communicating over the network 102), and includes (or is connected to) one or more storage device(s) 109. The storage device(s) 109 can comprise any durable computer-readable hardware storage medium (e.g., magnetic storage, flash storage, optical storage), including arrays of storage media, that be used to store any data generated by, received by (e.g., by the communications interface(s) 112), or otherwise used by any modules/components of the management system 101. Data may be stored in any appropriate form, such as in one or more database tables, one or more flat files, etc.

It will be appreciated that each of the modules/components depicted as part of the management system 101 may be configured to communicate with each other, and that the management system 101 may combine functionality of some modules into single modules, break functionality of individual modules into a plurality of modules, etc. As such, the particular number, naming, and arrangement of the models/components of the management system 101 are for illustrative purposes only, as an aid to describing the embodiments herein, and are non-limiting.

As depicted, the code generator module 105 can include a variety sub-components for accomplishing any the code generation embodiments described herein. For example, FIG. 1 illustrates that the code generator module 105 may include one or more of a generation component 105a, an encryption component 105b, and an encoding component 105c. The generation component 105a is configured to generate unique tracking codes, preferably based on a random number generator (whether that random number generator be implemented as dedicated hardware, or as a software algorithm).

The encryption component 105b is configured to implement one or more cryptographic encryption algorithms (e.g., public key, symmetric, asymmetric, etc.), in cooperation with the generation component 105a, to encrypt the tracking codes that are generated by the code generator module 105. As such, using the encryption component 105b, the code generator module 105 can generate cryptographically-obfuscated tracking codes that protect the identity the tracking code that was actually generated by the generation component 105a. The encryption component 105b can make it prohibitively difficult (i.e., practically impossible) for a third party to decipher the tracking codes generated by the generation component 105a, and the algorithms used by the generation component 105a to produce the tracking codes, without having access to a cryptographic key used to encrypt the tracking codes. Thus, the encryption component 105b can beneficially help prevent unauthorized third parties from producing counterfeit tracking codes, or anticipating tracking codes that may be used next, or the like.

In some embodiments, the encryption component 105b not only obfuscates tracking codes, but also normalizes their length (e.g., number of bytes), and/or represents the codes with a particular character encoding (e.g., ASCII, hexadecimal, etc.) that is useful for a specific purpose. In one specific example, the encryption component 105b may apply a first cryptographic algorithm (e.g., Advanced Encryption Standard (AES)) to the tracking code, to obfuscate the tracking code, and to also produce a representation that is a predefined number of bytes (e.g., 16, 24, or 32) that is useful for encoding/imprinting in a machine-readable form. In addition, the encryption component 105b may also apply a second cryptographic algorithm (e.g., Triple Data Encryption Algorithm (DES3)) to the tracking code, to obfuscate the tracking code, and to also produce a representation that is a predefined number of bytes (e.g., 13) and that uses an encoding (e.g. ASCII, hexadecimal, etc.) that is useful for encoding/imprinting in a human-readable form.

The encoding component 105c is configured to encode tracking codes (whether encrypted or unencrypted) into appropriate forms for physical imprinting/application to articles. For example, the encoding component 105c may convert tracking codes to machine-readable representations (e.g., QR Codes, Matrix Codes, etc.) and/or to human-readable forms (e.g., ASCII representations, Unicode representations, pictorial representations, etc.).

The code applicator module 106 is configured to orchestrate application of tracking codes to articles. In particular, the code applicator module 106 communicates with computer system(s) 110 at the production facilit(ies) 103, in order to cause hardware units (e.g., imprinting unit 111a and verification unit 111b) at production line(s) 111 of the production facilit(ies) 103 to imprint tracking codes generated by the code generator module 105 onto articles. The ellipses 110c and 111d indicate that each production facility 103 can include more than one computer system 110 and/or one or more corresponding production lines 111. Additionally, the ellipses 111c indicate that each production line 111 can include a variety of hardware units (both in number and in type).

As depicted, the code applicator module 106 can include a variety sub-components for accomplishing the application embodiments described herein. For example, FIG. 1 illustrates that the code applicator module 106 may include one or more of an imprinting component 106a, a verification component 106b, and a queue 106c. The queue 106c is configured to receive and store one or more tracking codes received from the code generator module 105. The imprinting component 106a is configured to cause the production line to imprint these tracking codes to articles. For example, the imprinting component 106a may send one or more messages through the network 102 to the computer system 110 of a particular production facility 103. These messages can be configured to cause a production line 111 at the production facility 103 to imprint one or more of the tracking codes obtained from the queue 106c to corresponding articles. For example, the messages may trigger a control component 110b of the computer system 110 to cause a hardware imprinting unit 111a to imprint the tracking codes to corresponding articles.

Hardware imprinting units can imprint tracking codes onto articles using a vast array of imprinting processes and encoding formats. Examples of imprinting processes may include an application of ink or other materials (e.g., using thermal transfer, propulsion, electrostatic processes, adhesives, etc.), etching (e.g., using heat, light, or mechanical components), application or programming of a digital chip (e.g., radio-frequency identification (RFID)), writing a magnetic or optical medium, or any other available application techniques. As indicated previously, examples of encoding formats may include machine-readable forms (e.g., QR Code, bar code, Matrix Code, etc.) and/or to human-readable forms (e.g., ASCII, Unicode, or other textual representations; pictorial representations; etc.).

The verification component 106b is configured to verify that tracking codes have been imprinted onto articles correctly and legibly. For example, the verification component 106b may send one or more messages through the network 102 to the computer system 110 of the particular production facility 103. These messages can be configured to cause the production line 111 at the production facility 103 verify that the tracking codes were imprinted on the articles correctly and legibly. For example, the messages may trigger the control component 110b of the computer system 110 to cause a hardware verification unit 111b to verify that the correct tracking codes were imprinted on the articles, and that these tracking codes are legible. For example, the hardware verification unit 111b may read a machine-readable code representation of the tracking code, may perform an optical character recognition (OCR) of a human-readable representation of the tracking code, etc. In some embodiments, the messages sent by the imprinting component 106a and the messages sent by the verification component 106b may be the same messages.

If the verification fails, for any reason (e.g., incorrect codes were imprinted, the imprinting was illegible, only a portion of codes for a batch of articles were printed, etc.), then the hardware verification unit 111b may physically reject the articles, such as by routing them to a different location than articles that were properly imprinted, discarding the articles, or even destroying the articles. When articles are rejected, the verification component 106b can either discard the corresponding tracking code(s) codes (e.g., delete them, mark them as invalid in one or more records stored in the storage device(s) 109, etc.) or recycle them by placing them back on the queue 106c.

If the verification passes, then the code applicator module 106 can pass the codes to the lifecycle manager module 107 to begin a lifecycle and custody chain for the codes/articles, as discussed below in connection with the lifecycle manager module 107.

In some embodiments, the code generator module 105 and/or the code applicator module 106 may be located, at least in part, at the computer systems(s) 110 of one or more of the production facilit(ies) 103 (or even fully duplicated at both systems). In such embodiments, the computer system(s) 110 may be viewed as being distributed extensions of the management system 101. Locating all or portions of the code generator module 105 and/or the code applicator module 106 can reduce the amount of network communications necessary to carry out code application.

The lifecycle manager module 107 is configured to maintain one or more records in the storage device(s) 109 as part of tracking and managing a lifecycle of tracking codes. These records can be used to track, for example, tracking codes that are active, a chain of custody associated with the tracking codes, and any information associated with a lifecycle of an article associated with the tracking code (e.g., geographical locations, images, work orders, associated assets, users who have interacted with the article, etc.), associations between different tracking codes, physical attributes of articles associated with tracking codes, etc. The lifecycle manager module 107 can manage lifecycle even as tracking codes/assets pass between different companies or levels of a supply chain. For example, the lifecycle manager module 107 may begin tracking lifecycle of a tracking code when it is created and applied to an asset at a production facility. The lifecycle manager module 107 may continue to track and manage the lifecycle of the tracking code as the asset to which it is applied is distributed to a warehouse, sold or supplied to a company, used by the company, etc.

To the accomplishment of the foregoing, FIG. 1 depicts that the lifecycle manager module 107 may include a variety of components, such as the depicted registration component 107a (e.g., for initiating records for new tracking codes), custody component 107b (e.g., for tracking custody, ownership, possession, etc.), and asset pairing component 107c (e.g., for associating a tracking code with a particular asset, such as would be the case if the article to which the tracking code is imprinted is a security seal or other tracking unit). These components represent only example functionality of the lifecycle manager module 107, and it will be appreciated in view of the disclosure herein that the lifecycle manager module 107 could include a great variety of components, depending on the types of lifecycles that are being tracked.

The interface module 108 is configured to provide one or more interfaces for interacting with the management device(s) 104 and/or the computer system(s) 110 at the production facility(ies) 103. For example, the interface module 108 may provide web interfaces for presentation within web browser applications at the management device(s) 104 and/or the computer system(s) 110, application programming interfaces (APIs) for interacting with specialized applications at the management device(s) 104 and/or the computer system(s) 110, etc. Accordingly, FIG. 1 depicts that the interface module 108 can include a variety of components for providing these interfaces, such as the depicted APIs component 108a and the depicted web interface component 108b. The interfaces provided by the interface module 108 can enable end-users to interact with tracking codes and their associated records, such as to record lifecycle events, to complete work orders, to transfer ownership/custody, etc. Wherever this disclosure references communications between the management system 101 and the computer system(s) 110 and/or the management device(s) 104, it will be appreciated that the communications may be facilitated by interfaces provided by the interface module 108

Secure Tracking Code Generation With Groupings

In some embodiments, the generation component 105a is configured to generate unique group tracking codes, as well as a plurality of unique unit tracking codes that correspond to each group tracking code. In some embodiments, the generation component 105a is also configured to generate group tracking codes corresponding to sub-groupings. These group tracking codes may be formatted such that—based only on a group code—the identity of each unit tracking code that is part of the grouping can be determined, as well as the identity of each group tracking code of each sub-grouping (if any). As such, embodiments enable tracking groupings of articles, and subgroupings of articles, while freeing management devices 104 that interact with grouped articles from the requirement of accessing data stored at the management system 101 to identify which tracking codes correspond to which group/sub-group.

For example, as explained in more detail hereinafter, embodiments contemplate production lines 111 that operate to apply tracking codes to groupings of articles in a secure and verified manner. Grouping articles may be useful in a great variety of contexts in which articles are distributed or used in groups, and in which custody of the articles, including their groups is helpful (e.g., pharmaceuticals).

One particular example context is the grouping of security seals (that can be securely applied to assets to be tracked) into groupings such as trays, bags, boxes, pallets, etc. that can be distributed various parties. For instance, a warehouse manager may take custody of a pallet of seals from a factory, and then assign each box to individual field managers. The field managers may then assign custody of bags of seals to individual workers. The individual workers may transfer custody of bags and/trays of seals among each other, apply seals to assets that are to be tracked (e.g., as part of fulfilling work orders), marks seals as being lost or damaged, etc.

Figure 2:
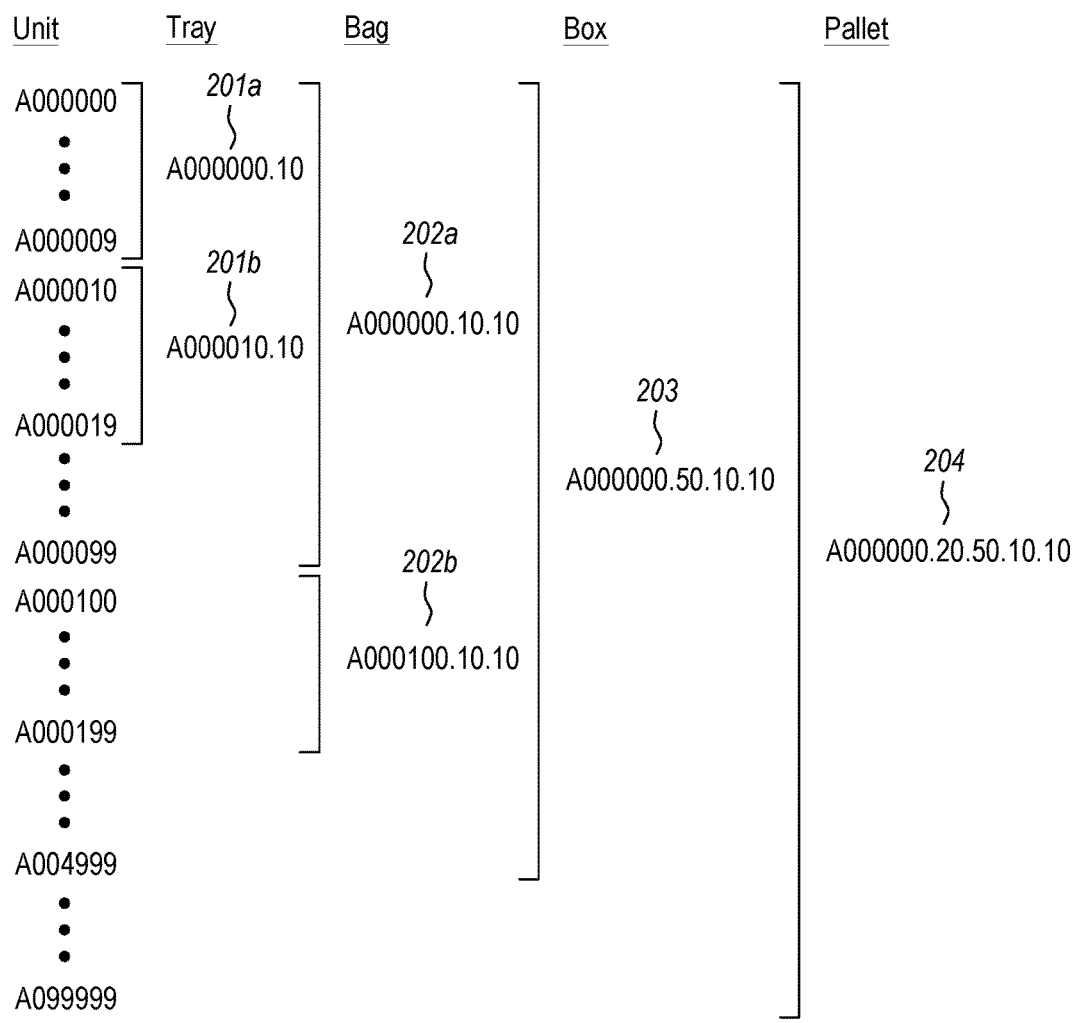
FIG. 2 illustrates an embodiment of unit tracking codes and group tracking codes.

FIG. 2 illustrates an example of unit tracking codes and group tracking codes, according to one embodiment. In this example, the generation component 105a generates unit tracking codes for individual units, and also generates group tracking codes for trays of units (ten units per tray), bags of trays (ten trays per bag), boxes of bags (fifty bags per box), and pallets of boxes (twenty boxes per pallet). While the units of trays, bag, boxes, and pallets are given in this example, it will be appreciated that any groupings are possible.

Thus, as depicted, the generation component 105a can generate 100,000 unit tracking codes, beginning with unit code A000000 and ending with unit code A099999. For trays, the generation component 105a generates a group tracking code comprising the unit tracking identifier of the first unit in the tray, and a multiplier indicating how many units are in each tray. Thus, the group tracking identifier 201a (i.e., A000000.10) identifies that unit A000000 is the first unit in the grouping, and that there are ten units in the grouping (i.e., units A000000-A 000009, as depicted). Similarly, the group tracking identifier 201b (A000010.10) identifies that unit A000010 is the first unit in the grouping, and that there are ten units in the grouping (i.e., units A000010-A000019, as depicted).

Going up one level to bags, the generation component 105a generates a group tracking code comprising the unit tracking identifier of the first unit in each bag, and a multiplier indicating how many units are in the bag. Thus, the group tracking identifier 202a (i.e., A000000.10.10) identifies that unit A000000 is the first unit in the grouping, and that there are 100 units (i.e., 10×10) in the grouping (i.e., units A000000-A000099, as depicted). Similarly, the group tracking identifier 202b (A000100.10.10) identifies that unit A000100 is the first unit in the grouping, and that there are 100 units (i.e., 10×10) in the grouping (i.e., units A000100-A000199, as depicted).

Going up one more level to boxes, the generation component 105a a generates a group tracking code comprising the unit tracking identifier of the first unit in each box, and a multiplier indicating how many units are in the box. Thus, the group tracking identifier 203 (i.e., A000000.50.10.10) identifies that unit A000000 is the first unit in the grouping, and that there are 5000 units (i.e., 50×10×10) in the grouping (i.e., units A000000-A004999, as depicted).

Going up yet one more level to pallets, the generation component 105a generates a group tracking code comprising the unit tracking identifier of the first unit in the pallet, and a multiplier indicating how many units are in the pallet. Thus, the group tracking identifier 204 (i.e., A000000.20.50.10.10) identifies that unit A000000 is the first unit in the grouping, and that there are 100,000 units (i.e., 20×50×10×10) in the grouping (i.e., units A000000-A099999, as depicted).

Notably, each subgrouping, including the units in each subgrouping, are identifiable from each group tracking code. For example, group tracking identifier 204 identifies that the unit tracking code is A000000, with the multiplier of 20.50.10.10. From the multiplier, each sub-grouping that sub-grouping's units, can be calculated.

Secured and Verified Tracking Code Application

Figure 3A:
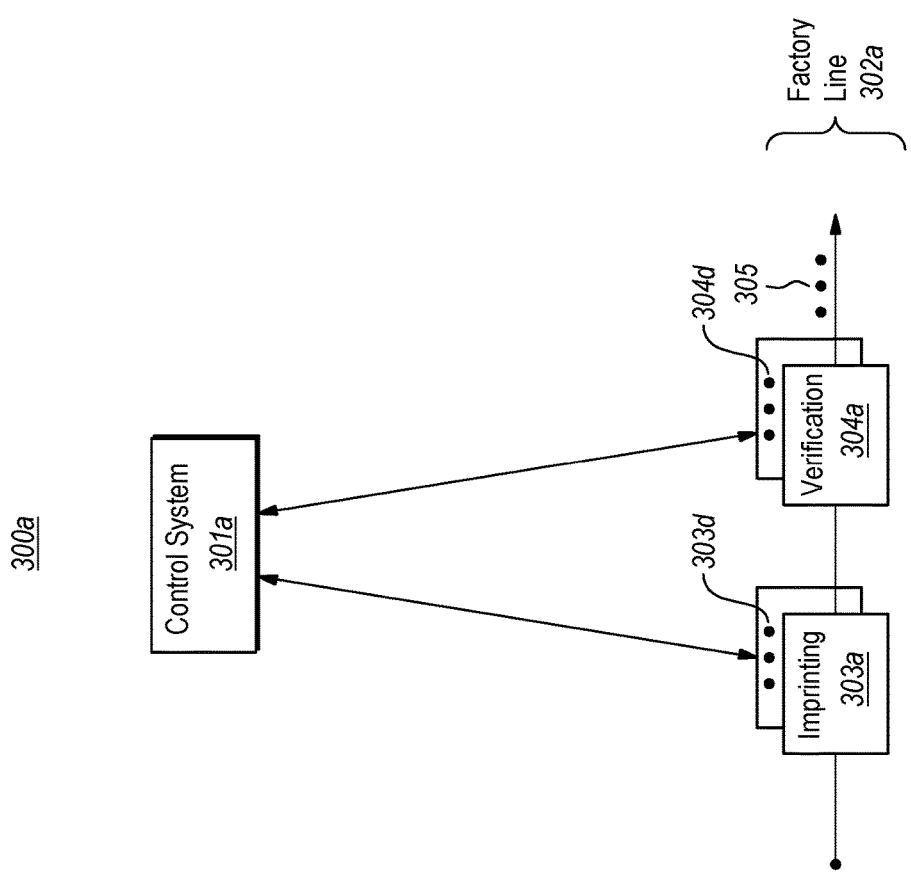
FIG. 3A illustrates a first example computing environment for imprinting tracking codes onto articles.

FIG. 3A illustrates an example computing environment 300a for imprinting tracking codes onto articles. In particular, the computing environment 300a performs one or more unique computer-controlled multi-step processes that verifiably apply tracking codes to articles, thereby physically transforming ordinary articles (e.g., individual assets, security seals, etc.) into uniquely-trackable articles. The environment 300a may correspond, at least in part, to computer systems and other hardware devices of one of the production facilit(ies) 103 of FIG. 1.

As depicted, the computing environment 300a includes a control system 301a that is communicatively coupled to components of a factory line 302a. For example, control system 301a could correspond to the control component 110b and/or the computer system 110, or even all or part of the management system 101.

Additionally, the factory line 302a includes a plurality of hardware units, such as the depicted imprinting unit 303a (e.g., corresponding to hardware imprinting unit 111a) and the depicted verification unit 304a (e.g., corresponding to hardware verification unit 111b). As indicated by the ellipses 303d, 304d, and 305, the factory line can include additional hardware units (e.g., to perform additional code imprinting/verifications, or to otherwise transform an article), and each hardware unit may comprise multiple hardware units (e.g., the verification unit 304a could comprise one or more tracking code reading devices and one or more actuators for use in rejecting articles to which tracking codes were incorrectly applied). Each hardware unit (303a, 304a, etc.) is controlled by the control system 301a, and may provide feedback to the control system 301a, as indicated by the double-sided arrows. In some embodiments, the factory line 302a comprises one or more conveyer belts (e.g., represented by the horizontal arrow) or other devices that carry one or more articles through the hardware units (303a, 304a, etc.).

Figure 3B:
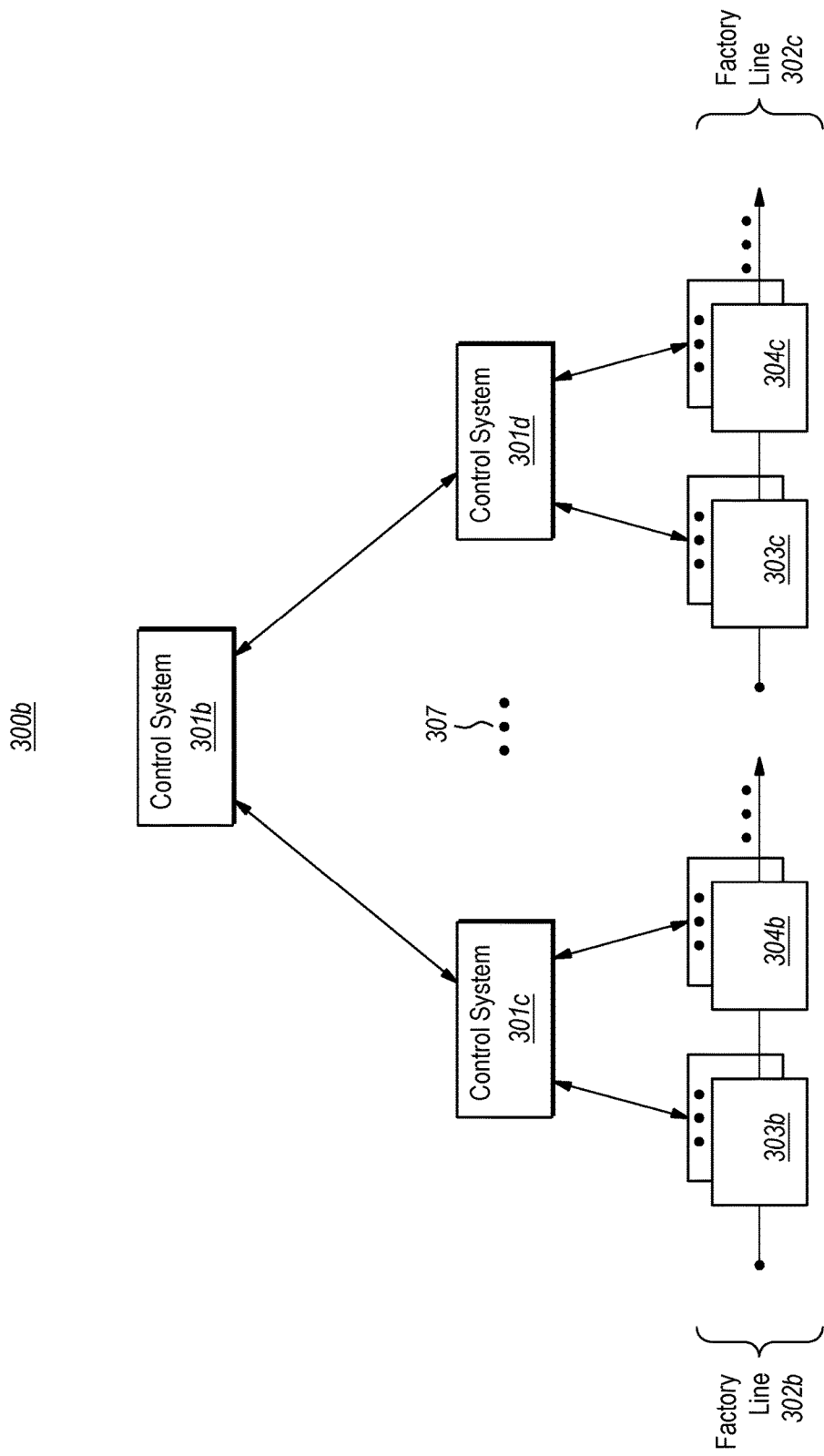
FIG. 3B illustrates a second example computing environment for imprinting tracking codes onto articles.

FIG. 3B illustrates a similar computing environment 300b for imprinting tracking codes onto articles. However, the computing environment 300b depicts that there may be multiple control systems and multiple factory lines. For example, in FIG. 3B, a control system 301b communicates with two different control systems (301c and 301d) corresponding to two different factory lines (302b and 302c) that each include their own hardware units (e.g., hardware imprinting units 303b and 303c, and hardware verification units 304b and 304c). As indicated by the ellipses 307, there may be any number of production lines and control systems.

In some embodiments, the control system 301b may correspond to the management system 101 of FIG. 1, and each of control system 301c and 301d correspond to different computer system 110 of the same production facility 103 or different production facilities. In other embodiments, the control system 301b may correspond to the computer system 110 of a production facility 103, and each of control system 301c and 301d correspond to different control components 110b of the computer system 110, or correspond to different computer systems 110 of the production facility 103. As will be understood in view of the disclosure herein, many other combinations are possible.

Returning to FIG. 3A, based on commands from the control system 301a, the hardware imprinting unit(s) 303a physically imprint tracking codes onto corresponding articles. As discussed previously, this may comprise application of ink or other materials, etching, application or programming of a digital chip, writing a magnetic or optical medium, etc. Then, the hardware verification unit(s) 304a verify that the imprinting was performed correctly (e.g., that the correct tracking code was imprinted on the article, and that the tracking code is readable/legible). The hardware verification unit(s) 304a can comprise any appropriate hardware for reading tracking codes, such as camera(s), bar code reader(s), RFID reader(s), etc. In some embodiments, one or more of the control system 301a or the hardware verification unit(s) 304a can perform image processing such as, for example, to perform an OCR of text, to recognize a barcode or QR code, etc.

The hardware verification unit(s) 304a can determine whether each tracking code was imprinted legibly, or can send data (e.g., imagery data) to the control system 301a that is usable by the control system 301a to determine whether each tracking code was imprinted legibly. As discussed previously, the article to which the code was imprinted can be rejected by one or more hardware elements of the hardware verification unit(s) 304a if the code was not imprinted correctly, or the tracking code can be recorded as active in the storage device(s) 109 if it was imprinted correctly. As such, the embodiments herein provide a verified process that ensures that tracking codes are only made active in storage device(s) if they have been properly applied to an article.

In some embodiments, the computing environment 300a imprints articles using multiple imprinting processes. For example, the hardware imprinting unit(s) 303a and the hardware verification unit(s) 304a could imprint/verify using different processes, or there could be additional hardware imprinting unit(s)/hardware verification unit(s) that imprint/verify using different processes than the hardware imprinting unit(s) 303a and the hardware verification unit(s) 304a. For example, the hardware imprinting unit(s) 303a and the hardware verification unit(s) 304a may operate using a first process (e.g., a transfer of ink), while additional hardware imprinting unit(s)/hardware verification unit(s) operate using a second process (e.g., etching). Any combination of imprinting processes can be used.

Figure 4:
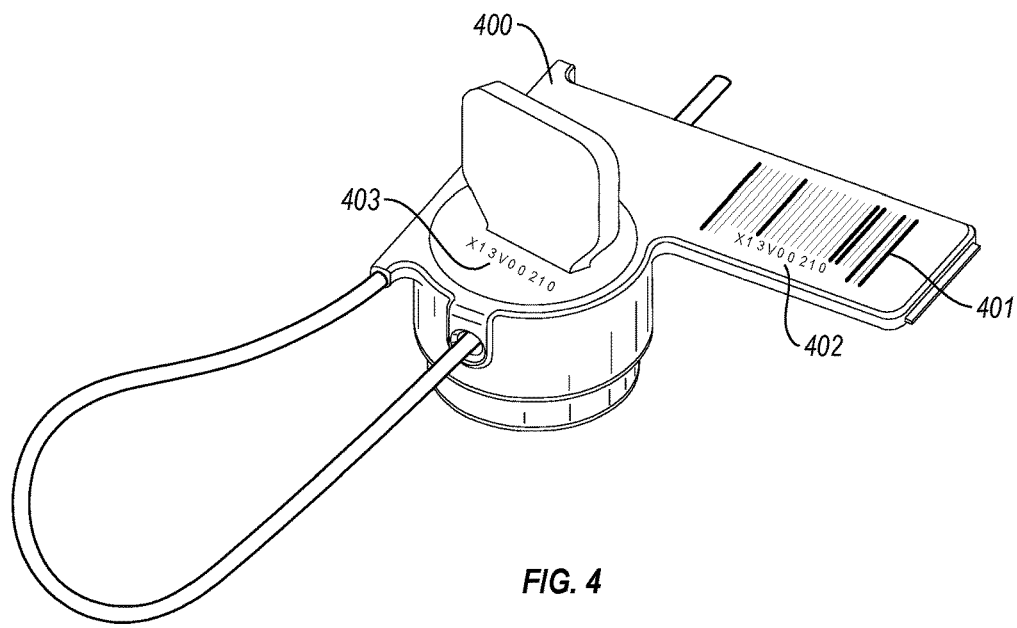
FIG. 4 illustrates an example article that has been imprinted with a both a first imprinting process and a second imprinting process.

For example, FIG. 4 illustrates an article 400 (e.g., a security seal) that has been imprinted with both a first imprinting process and a second imprinting process. For example, in FIG. 4 the first portion of the seal has been imprinted with using a first process (e.g., a thermal transfer of ink) with a tracking code in both a human-readable form 402 (i.e., the ASCII 'X13V002010') and a machine-readable form 401 (i.e., the bar code). In addition, a second potion of the seal has also been imprinted using a second process (e.g., a laser etching) with the tracking code in a human-readable form 403 (i.e., the ASCII 'X13V002010'). The factory line 302a can verify each of these imprintings, all at once or progressively, to ensure that the proper code was imprinted, and that it is legible.

Figure 5:
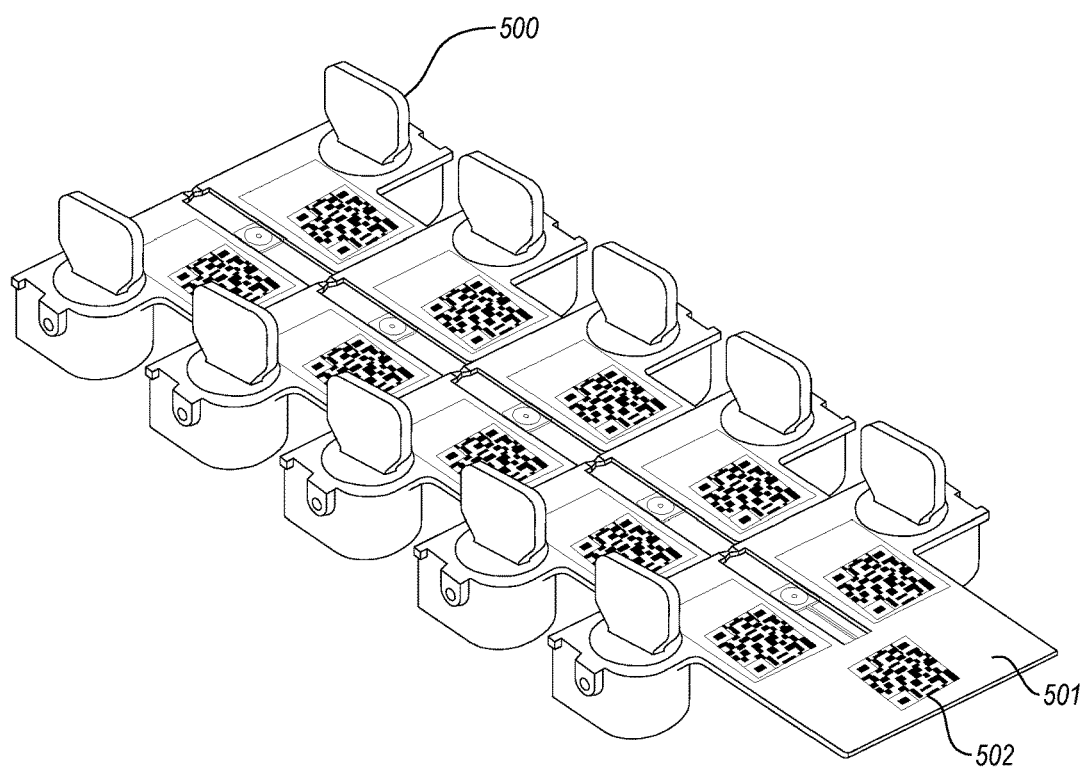
FIG. 5 illustrates an example tray of articles that has been imprinted with both unit tracking codes and a group tracking code.

As discussed previously, embodiments include generating tracking codes that are parts of groupings. In some embodiments, the factory line 302a imprints and verifies a group tracking code and its unit tracking codes together. For example, FIG. 5 illustrates an example tray of articles (i.e., a tray of the seals 400 of FIG. 4) that has been imprinted with both unit tracking codes and a group tracking code. As depicted in FIG. 4, the factory line 302a has printed a QR code onto each seal, with each QR code encoding the unit tracking code that corresponds to that seal. Additionally, the factory line 302a has imprinted a QR code 502 onto a tab 501 that is associated with the tray of seal. This QR code encodes the group tracking code for the tray. When imprinting and verifying a group tracking code and its unit tracking codes together, the whole group can be accepted or rejected.

For example, if, during the verification, single QR code (whether on a seal or on the tab 501) is incorrect or unreadable, the entire tray can be rejected.

Embodiments can include verification of packaging of articles into larger units. For example, using the above example of packaging articles into trays, bags, boxes, pallets, etc., a verification can be performed during each packaging operation. As discussed above in connection with FIG. 5, a verified association of each individual article (e.g., seal) with a group code for a tray may have occurred when imprinting those each articles (i.e., each seal and the tray tab) with tracking codes.

A verified process may then be used when packing those trays into bags. For example, a group code may be "opened" when it is printed on a bag label, or when it is scanned. Then, the group code for each tray may be scanned as they are inserted into the bag. The bag may then be "closed" by re-scanning its group code, after all the required trays have been scanned. A record of each of these events may be recorded in the storage devices(s) 109, thus ensuring a verified packaging. If there was any error during the process (e.g., a tray was omitted, the wrong tray was scanned, etc.), the management system 101 may prevent the bag from being closed, may produce errors or exceptions, may discard or deactivate all tracking codes involved, etc. A similar process may be followed when packaging bags into boxes, and when packaging boxes onto pallets.

Figure 6:
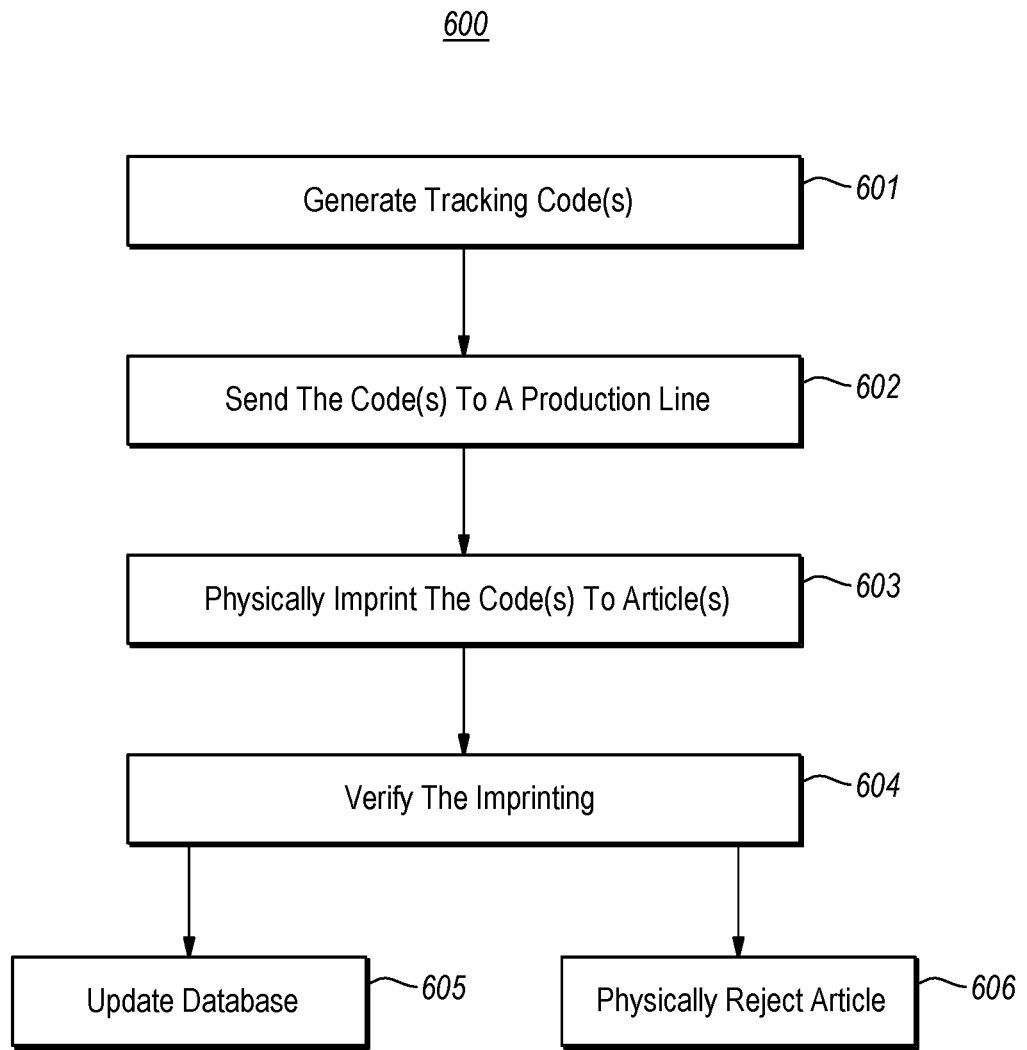
FIG. 6 illustrates a flowchart of an example method for verifiably imprinting tracking codes onto physical articles.

In view of the foregoing, FIG. 6 illustrates a flowchart of an example method 600 for verifiably imprinting tracking codes onto physical articles. The method 600 will be described in connection with the computing environments of FIGS. 1 and 3A.

As depicted, method 600 includes an act 601 of generating tracking code(s). Act 601 may comprise generating, at one or more hardware processors, one or more tracking codes. For example, the code generator module 105 may generate one or more tracking codes using the generation component 105a. These tracking codes may be cryptographically protected by the encryption component 105b. In addition, the code generator module 105 may produce different encodings (e.g., QR code, ASCII, etc.) of each tracking code using the encoding component 105c. In some embodiments, the code generator module 105 may generate a group tracking code, as well as a plurality of unique unit tracking codes that correspond to the group tracking code.

Method 600 also includes an act 602 of sending the code(s) to a production line. Act 602 may comprise sending the one or more tracking codes towards an automated computer-controlled production line, along with one or more first messages. For example, the code applicator module 106 may send one or more of the tracking codes towards a control component 110b of a production facility 103 that includes a production line 111. In some embodiments, act 602 includes sending tracking codes using multiple encoding techniques (e.g., QR code and ASCII). Sending the code(s) can include sending additional instructions, such as which imprinting process(es) should be used.

Method 600 also includes an act 603 of physically imprinting the code(s) to articles. Act 603 may comprise the production line being caused by the one or more first messages to physically imprint, by one or more hardware imprinting units of the production line, each of the one or more tracking codes onto a corresponding article. For example, the control component 110b can cause the hardware imprinting unit 111a to physically imprint the tracking code(s) to a corresponding article using one or more imprinting processes and one or more encoding techniques. In some embodiments, hardware imprinting unit 111a to imprints corresponding unit tracking codes to each of a plurality of associated articles, as well as a group tracking code to a group identification article (e.g., the tab 501).

Method 600 also includes an act 604 of verifying the imprinting. Act 604 may comprise the production line being caused by the one or more first messages to physically verify, by one or more hardware verification units of the production line, the physical imprinting by the one or more hardware imprinting units of each of the one or more tracking codes onto their corresponding article, including the one or more hardware verification units performing a machine reading of each of the one or more tracking codes as imprinted on its corresponding article. For example, the control component 110b can cause the hardware verification unit 111b to verify each imprinting performed in act 603. This can include imaging machine-readable codes and/or human-readable codes, performing an electromagnetic reading, etc. Act 604 may also comprise at least one result of the verification by the one or more hardware verification units of the physical imprinting of each of the one or more tracking codes onto their corresponding article. For example, the verification component 106b can receive any applicable data generated by the hardware verification unit 111b.

Act 604 may include an act 605 of updating a database. Act 605 may comprise, for each of the one or more tracking codes, if the at least one result of the verification indicates that the tracking code was correctly imprinted on its corresponding article, recording, in a durable computer-readable hardware storage medium, one or more records that indicate the tracking code as being imprinted on an article and that initiate a custody chain for the tracking code and the article. For example, if the tracking code(s) were correctly imprinted, the verification component 106b may cause the registration component 107a and/or the custody component 107b of the lifecycle manager module 107 can create or modify one or more records in the storage device(s) 109, indicating that the code(s) are imprinted and initiating a custody chain for the code(s).

Alternatively, act 604 may include an act 606 of physically rejecting the article. Act 606 may comprise, for each of the one or more tracking codes, if the at least one result of the verification indicates that the tracking code was incorrectly imprinted on its corresponding article, sending one or more second messages towards the automated computer-controlled production line, which cause the one or more hardware verification units to physically reject the corresponding article. If the tracking code(s) were incorrectly imprinted or illegible, the verification component 106b may cause the control component 110b to instruct the hardware verification unit 111b to physically reject the article(s) associated with the tracking code(s). For example, the hardware verification unit 111b may discard, destroy, or re-route the article(s). When the tracking code(s) comprise group and unit tracking codes, the articles may be rejected if any of the codes are improperly applied or illegible.

In some embodiments, when a tracking code/article is rejected, the verification component 106b discards the tracking code(s), queue the tracking code(s) for re-imprinting (e.g., in the queue 106c), and/or cause one or more records to be recorded in the storage device(s), which indicate the tracking code(s) as being invalid or inactive.

Lifecycle Management

As indicated previously, the lifecycle manager module 107 is configured to maintain one or more records in the storage device(s) 109 as part of tracking and managing a lifecycle of tracking codes. As such, the management system 101 serves as a centralized platform for tracking and managing the lifecycle of individual articles (and groups of articles) as they pass from location-to-location and from user-to-user. While examples of lifecycle management are now presented, additional examples may be found in commonly-owned and co-pending U.S. patent application Ser. No. 14/270,539, filed May 6, 2014, and entitled "MANAGEMENT TRACKING IDENTIFIER FORMAT, PROCESSING, AND DATA ASSOCIATIONS," the entire contents of which is incorporated herein by reference in its entirety.

The records stored in the storage device(s) 109 can store a great variety of information, relative to an article that has been imprinted with a tracking code. As indicated previously, the one or more records can indicate that the tracking code was correctly imprinted on the article, and can store a custody chain for the article (e.g., one or more user identifiers of users who have possessed, interacted with, have been otherwise responsible for the article). In addition, the one or more records may store, for example, one or more photos of the article; one or more current or past geo-locations of the article (e.g., GPS coordinates); one or more date/time-stamps of any event associated with the article; one or more indications of article state, such as lost, stolen, damaged, defective, etc.; one or more user-entered comments/observations about the article; one or more indications of work or maintenance that has been performed on the article; one or more indications of contents of an article (e.g., if the article is a container); etc.

As has been indicated previously, in some embodiments articles may comprise seals that can be applied to assets that are to be tracked. In such embodiments, the one or more records may identify an asset identifier for the asset to which the seal has been applied. This may be a serial number, another tracking code (e.g., as generated by the management system 101), or any other appropriate identifier. In these embodiments, any of the foregoing data fields can also apply to the asset to which the seal has been applied. As indicated, the asset identifier for the asset to which a seal has been applied may comprise another tracking code as generated by the management system 101. As such, the one or more records may associate articles that were each imprinted with tracking codes using the embodiments described herein, and that are each managed by the management system 101. In one specific example, tracking codes may be applied to articles comprising security seals, and to articles comprising utility meters. Then, the management system 101 can be used to track/manage the utility meters throughout their lifecycle (e.g., deployment in the field, maintenance, etc.), including their being sealed by the seals when work is performed. Thus, the management system 101 may store associations between the tracking codes of the seals, and the tracking codes of the utility meters.

Additionally or alternatively, the one or more records can store separate data specific to the asset (e.g., photos of the asset, comments/observations relative to the asset, etc.). Furthermore, the one or more records may store a user identifier of the user who applied the seal to the asset; whether the seal has been sealed/applied, tampered with, damaged, etc.; a visual confirmation seal was applied to the asset (e.g., a photograph of the seal on the asset); the identity of one or more field service orders (work orders) associated with the seal/asset (e.g., a fields service order that instructed a worker to apply the seal to the asset); etc.

The lifecycle manager module 107 can enable a great variety of management actions relative to tracking codes. For example, the lifecycle manager module 107 can facilitate assigning tracking unit(s) to a user and/or transferring tracking unit(s) between users; assigning tracking units (e.g., seals) to other assets, modifying and/or providing status of tracking codes, etc.

Figure 7:
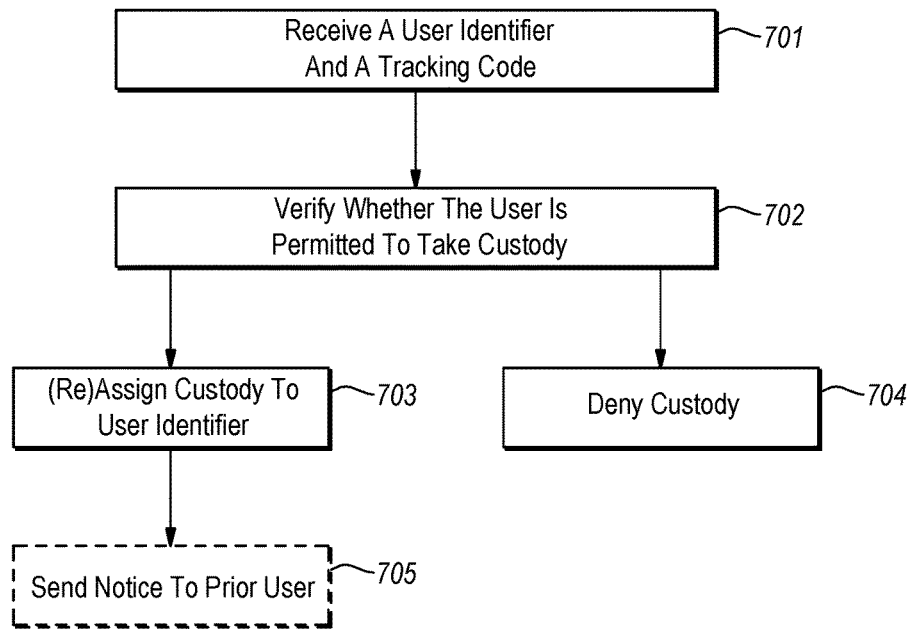
FIG. 7 illustrates a flowchart of an example method for facilitating assigning tracking units to a user and/or transferring tracking units between users.

For example, FIG. 7 illustrates a flowchart of an example method 700 for facilitating assigning tracking unit(s) to a user and/or transferring tracking unit(s) between users. As depicted, the method 700 includes an act 701 of receiving a user identifier and a tracking code. For example, the lifecycle manager module 107 may receive a user identifier from a management device 104, such as in response to the management device 104 having scanned a machine-readable encoding of the tracking code, or having received user input providing the tracking code.

The method 700 also includes an act 702 of verifying whether the user is permitted to take custody of the tracking code. For example, the custody component 107*b* may query the storage device(s) 109 to identify custody records for the tracking unit. The custody component 107*b* may also identify one or more rules for determining whether custody can be granted to the received user identifier. For example, rules may include rules that identify tracking codes of which the user identifier is permitted to take custody, that identify users the user identifier is permitted to take custody from, that identify how to permit re-assignment of tracking codes that are part of groupings, that identify how to permit assignment of tracking codes that are associated with other assets, that identify if reassignments must be authorized by the prior user, etc.

The method 700 also includes either (re)assigning custody of the tracking code to the user identifier (act 703), or denying custody (act 704). For example, if it is determined in act 702 that the user is permitted to take custody of the tracking code, the custody component 107*b* may update one or more records in the storage device(s) 109 to assign custody of the tracking code to the user, or to re-assign the tracking code from the prior user. If the tracking code has been re-assigned, the method 700 may include and act 705 of sending a notice to the prior user, such by way of a message from the management system 101 to a management device 104 of the prior user. Thus, a management device 104 corresponding to the prior user may update a user interface to reflect the reassignment, may receive a push notification and display a notice of the reassignment, etc.

The method 700 can include a variety of additional functions as part of assigning or re-reassigning custody of a tracking code. For example, the lifecycle manager module 107 may record in the storage device(s) 109 one or more of a photo of the article associated with the tracking code, a date/time-stamp of when the (re)assignment occurred, a geo-location of the article at the time of the (re)assignment, any user-submitted comments/observations, etc. This information may be received from one or more of the management device(s) 104, such as from a prompting that was made at the management device(s) 104 in connection with the APIs 108*a* or the web interface 108*b* of the interface module 108.

Example scenarios enabled by the method 700 are now presented. As indicated previously, embodiments may include use of group tracking codes, which have a plurality of unit tracking codes associated therewith. Thus, in some embodiments, (re)assignment of a tracking code may include (re)assigning a plurality of tracking codes, either because the tracking code was a group code (and so the group code and all unit codes in the group are (re)assigned to the user identifier), or because the tracking was a unit code that is part of a group (and so each unit code in the group is (re)assigned to the user identifier).

For example, embodiments may enable individuals to re-assign groupings of articles between each other. In an embodiment, a transfer is initiated by the custody component 107b when it receives an identified tracking code from a management device 104 (e.g., a mobile phone) of the user that currently has custody of the identified tracking code, as well as a user identifier of a user that should receive a plurality of tracking codes that are identified based on the identified tracking code. For example, a management device 104 may be used to scan a group tracking code associated with a plurality of unit tracking codes, or to scan one of the plurality unit tracking codes.

When the identified tracking code is the group tracking code, the plurality of tracking codes may include each unit tracking code associated with the group tracking code. When the identified tracking code is one of the unit tracking codes, the plurality of articles may include each of the plurality of unit tracking codes of which the unit tracking code is a member.

The custody component 107b may verify that the received user identifier is authorized to take custody of the plurality of tracking codes, and, when the user identifier is authorized, re-assign the plurality of tracking codes to the received user identifier (e.g., by updating one or more custody records in the storage device(s) 109). In some embodiments, recipient must verify/acknowledge the receipt for the reassignment to be authorized.

By way of a concrete example, suppose that the articles were security seals packaged into groupings (e.g., trays) that are used by workers in the field as part of installing equipment. If a first worker runs out of seals, the first worker can approach a second worker, and ask the second worker for some additional seals. The second worker can then scan, with a mobile management device 104, a group of seals (e.g., group tracking code imprinted on the tray) and specify that custody of those seals be reassigned to the first worker.

In some embodiments, only an entire grouping of articles can be authorized for reassignment. For example, the second worker may only be permitted to reassign an entire tray of seals, and not a partial tray. Thus, for example, a transfer request may be denied if the second worker attempts to reassign a group tracking code (e.g., for a tray of seals) to the first worker, in which some of the plurality of unit tracking codes of the group (e.g., seals in the tray) are unavailable (e.g., because the second worker has already used some of the seals).

In another transfer embodiment, a transfer is initiated by the custody component 107b when it receives an identified tracking code from a management device 104 (e.g., a mobile phone) of the user desired to receive custody of the identified tracking code. In this circumstance, the custody component 107b may verify that the user identifier associated with the management device 104 is authorized to take custody of a plurality of tracking codes that are identified based on the identified tracking code, and, when the user identifier is authorized, re-assign the plurality of tracking codes to the received user identifier (e.g., by updating one or more custody records in the storage device(s) 109). In some embodiments, the re-assignment is performed without any additional authorization or input from the user that currently has custody of the tracking codes.

By way of a concrete example, suppose again that the articles were security seals packaged into groupings (e.g., trays) that are used by workers in the field as part of installing equipment. If a first worker runs out of seals, the first worker can approach a second worker, and ask the second worker for some additional seals. The first worker can then scan, with his mobile management device 104, a group of seals (e.g., group tracking code imprinted on the tray) to receive custody, without any input from the second user.

In some embodiments, only an entire grouping of articles can be authorized for reassignment. For example, the second worker may only be permitted to reassign an entire tray of seals, and not a partial tray. Thus, for example, a transfer request may be denied if the second worker attempts to reassign a group tracking code (e.g., for a tray of seals) to the first worker, in which some of the plurality of unit tracking codes of the group (e.g., seals in the tray) are unavailable (e.g., because the second worker has already used some of the seals).

Figure 8:
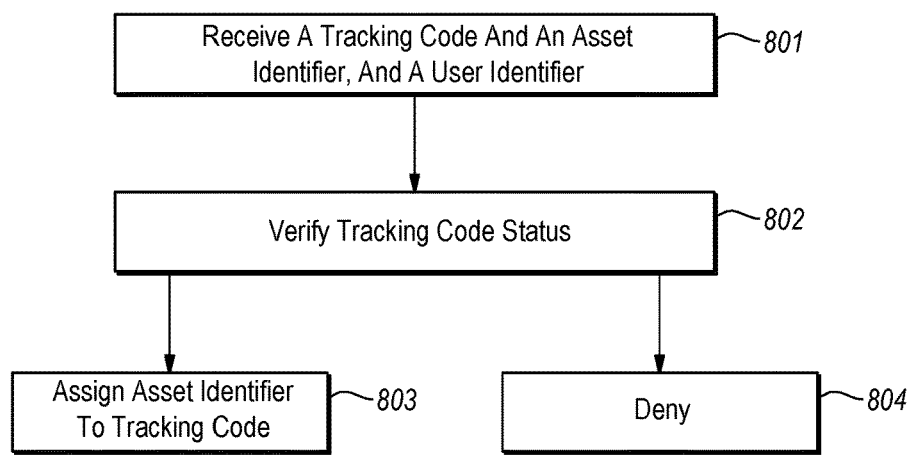
FIG. 8 illustrates a flowchart of an example method for assigning tracking units to other assets.

FIG. 8 illustrates a flowchart of an example method 800 for assigning tracking units (e.g., seals) to other assets. As depicted, the method 800 includes an act 801 of receiving a tracking code, an asset identifier, and a user identifier. For example, the asset pairing component 107c can receive from a management device 104 a tracking code (e.g., associated with a security seal), an asset identifier (e.g., associated with an asset to which the security seal is being applied), and a user identifier (e.g., associated with a user of the management device 104).

The method 800 also includes an act 802 of verifying tracking code status. For example, the asset pairing component 107c can verify, based on one or more records in the storage device(s) 109, whether the tracking code is available to be paired with the asset identifier. For example, the tracking code may be associated with various status, such as available (e.g., a security seal is available to be applied), applied (e.g., the security seal has been applied to an asset), lost (e.g., the security seal has been reported as lost), damaged (e.g., the security seal has been reported as damaged), or fraud (e.g., the security seal has been reported as tampered with, broken, etc.). Act 802 may also include verifying that the user identifier has custody of the tracking code, and that the user identifier is authorized to associate the tracking code with assets.

The method 800 also includes an act 803 of assigning the asset identifier to the tracking code, or alternatively and act 804 of denying the request. For example, if the status of the tracking code is available, and the user has custody of the tracking code and is authorized to associate the tracking code with assets, then the asset pairing component 107c may authorize the pairing, and update one or more records in the storage device(s) 109 to identify the tracking code as being applied and associated with the asset identifier. Alternatively, if the status of the tracking code is applied, lost, damaged, fraud, etc., if the user does not have custody of the tracking code, or the user is not authorized to associate the tracking code with assets, the request to pair the tracking code with the asset identifier can be denied.

In some embodiments, the management system 101 only permits a user to begin interacting with tracking codes that are part of a group when they have already used all other tacking units applied to the same type of article. For example, if the articles are seals, the management system 101 may prevent a user from associating a seal from a new tray of seals with an asset if the user also has custody of another tray that is partially used (i.e., some seals from the tray have been applied, but others have not). The same goes for groupings. For example, the management system 101 may prevent a user from using trays/seals from a new bag until all of the seals in their prior bags have been applied or marked as lost/damage, may prevent a user from using trays/seals/bags from a new box until all of the seals in their prior boxes have been applied or marked as lost/damage, etc. As such, the management system 101 can ensure that custody and use of seals (or other articles to which tracking codes are applied) is tightly regulated.

In some embodiments, the lifecycle manager module 107 is configured to treat different types of group tracking codes differently. In particular, the lifecycle manager module 107 may treat some group tracking codes as corresponding to second-class "batch groups," and/or treat other group tracking codes as corresponding to "list groups."

The function of second-class batch groups is to apply the same action to a number of first-class groups or items that are within the batch group. For example, the lifecycle manager module 107 may treat any group tracking codes corresponding to trays as batch groups. When trays are treated as batch groups, the lifecycle manager module 107 allows actions to take place with respect to the group without first having to first "open" or "unpack" that group. Thus, for example, seals within a tray may be used/applied without first having to "open" the tray. As another example, the lifecycle manager module 107 may treat any group tracking codes corresponding to pallets as batch groups, enabling pallets to be split/opened for transport and delivery without authorization from the lifecycle manager module 107. Thus, batch groups are "second class," since the lifecycle manager 107 does not manage their lifecycle. This allows for partial transfers, where, for example, a tray that is half-used can be transferred since the actions apply over the remaining seals, and not the tray itself. In some embodiments, the functionality of second-class batch groups is achieved by use of a special marker in the generated group tracking code, but the group tracking codes are otherwise encoded the same as the first class groups. In some embodiments, first class groups are encoded without taking into account these second-class groups.

The function of first-class "list groups" is to generate tracking codes for a mix of unserialized tracking codes. For example, a tracking code for a list group may be used for a delivery order for different tracked materials, where the tracking codes on the tracked materials are not susceptible to grouping, since they have different product identifiers/code ranges. In some embodiments, the functionality of list groups achieved by a special marker in the generated group tracking code, and by storing a count and then a list of all serializable tracking codes inside this larger list code.

Field Service Orders

In an embodiment, the lifecycle manager module 107 may be configured to facilitate processing of field service orders (work orders). In particular, the lifecycle manager module 107 may interact with a management device 104 at each step of the process of processing a service order, to verify and document that each step is performed correctly, and to ensure that incorrect actions are not permitted. For example, in the context of articles that comprise security seals, a field service order can outline to a worker one or more tasks to be performed with respect to an asset (e.g., a utility meter), such as installation, maintenance, inspection, etc., including the association of a security seal with the asset in connection with performing the service order. The example of seals and utility meters is used to illustrate some examples, though the management system 101 may be usable in a great variety of contexts for managing performance of service orders. As such, any reference to seal and utility meters can be interpreted as being references to articles more generally.

For example, the storage device(s) 109 store a field service orders. The management system 101 can then send service orders to management devices 104 of workers, who may then perform the service orders in a manner presented at the management devices 104 (e.g., as instructed using the lifecycle manager module 107 and/or the interface component 108). For example, a service order may specify that a worker install a utility meter. In doing, so the management system 101 and/or the service order may cause the worker's management device 104 prompt and instruct the worker in each step of the process, to ensure that worker installs the correct utility meter, to document the worker's performance, and to ensure that the utility meter is sealed.

Initially, the management system 101 and/or the service order may cause the worker's management device 104 to prompt the worker to scan or enter a first tracking code of the utility meter that the user is installing. When received, the management device 104 may send that first tracking code to the management system 101, where the management system 101 may access one or more records in the storage device(s) 109 relative to the first tracking code. These records may identify the type of the utility meter, the custody chain for the utility meter, or any other relevant data about the utility meter. If the utility meter is the correct utility meter (e.g., it is a commercial-grade utility meter, when the field service order is for installing a utility meter on a commercial property), and is available for installation, the management system 101 may assign custody of the utility meter to the worker, and cause the worker's management device 104 to instruct the worker to perform one or more installation tasks. If the utility meter is not the correct utility meter (e.g., it is a residential-grade utility meter, when the field service order is for installing a utility meter on a commercial property), or it is not available for installation, the management system 101 may cause the worker's management device 104 to instruct the worker of the error, and to prompt the worker to provide a tracking code for the correct type of utility meter or for an available utility meter. As such, the management system 101 provides a unique feedback system that ensures that the correct assets are used in the correct contexts.

During performance of each task, the management system 101 and/or the service order may cause the worker's management device 104 to prompt the user to provide a verification of each task (e.g., by taking a photograph, etc.), and send those verifications to the management system 101 for recording in the storage device(s) 109. In some embodiments, the worker is not permitted by the management device 104 to proceed with the next task until the current task is completed.

When each task is performed, the management system 101 and/or the service order may cause the worker's management device 104 to prompt the worker to apply a seal to the utility meter. As a result, the worker's management device 104 can receive a second tracking code associated with a security seal, and send it to the management system 101. The management service, can then record an association between the first tracking code of the utility meter and the second tracking code of the seal.

The management system 101 can record a great variety of information in connection with completion of a service order and/or application of a seal to an asset (e.g., utility meter). For example, based on information received from the worker's management device 104, the management system 101 may record the identity of the worker, a worker "signature" verifying that the work was performed properly, verification that the utility meter has passed a particular test, a geo-location of where the work was performed (and where the utility meter is located), a date/time stamp, one or more photos (e.g., of the seal, of the asset, of the work order, of the seal on the asset), etc.

Additionally, the management system 101 can be used to verify the integrity of the seal and/or utility meter remains intact. For example, in connection with performance of a subsequent service order on the utility meter, the management system 101 and/or the subsequent service order can cause the worker's management device 104 to prompt the worker to re-scan the first tracking code of the utility meter and/or the second tracking code of the security seal. The management system 101 can then verify that these tracking codes are the ones that are recorded at the storage device(s) 109, and that are expected. If they differ from what is expected, the management system 101 can identify that the seal and/or the utility meter has been tampered with.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

Embodiments of the present invention may comprise or utilize a special-purpose or general-purpose computer system that includes computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud computing model can be composed of various characteristics, such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A computer system, comprising:
a first computing device that includes one or more first processors and one or more first computer-readable media having stored thereon first computer executable instructions that are executable to cause the first computing device to:
send, to a management service, one or more first messages including a first user identifier associated with the first computing device and a tracking code that is physically imprinted on an article, wherein the management service includes one or more data records indicating that a second user identifier associated with a second computing device has custody of the tracking code, and that the first user is permitted to take custody of the tracking code, and wherein the one or more first messages cause the management service to determine that the first user is permitted to take custody of the tracking code and to update the one or more data records to assign custody of the tracking code to the first user identifier;
based on sending the first user identifier and the tracking code to the management service:
receive, from the management service, one or more second messages indicating that the first user identifier has been assigned custody of the tracking code; and
display an indication that the first user identifier has custody of the article onto which the tracking code has been imprinted; and
the second computing device, which includes one or more second processors and one or more second computer-readable media having stored thereon second computer executable instructions that are executable to cause the second computing device to:
receive, from the management service, one or more third messages indicating that custody of the tracking code has been reassigned to the first user identifier; and
display an indication that custody of the article onto which the tracking code has been imprinted has been reassigned from the second user identifier to the first user identifier.

2. The computer system of claim 1, wherein updating the one or more data records to assign custody of the tracking code to the first user identifier comprises adding one or more data records to a custody chain.

3. The computer system of claim 1, wherein the tracking code corresponds to a grouping article that corresponds to a plurality of other articles, and wherein updating the one or more data records to assign custody of the tracking code to the first user identifier comprises assigning a plurality of tracking codes that each corresponds to one of the plurality of other articles to the first user identifier.

4. The computer system of claim 1, wherein the management service determines that the first user identifier is permitted to take custody of the tracking code by matching one or more rules that include at least one of: (i) one or more first rules that identify tracking codes of which the first user identifier is permitted to take custody, (ii) one or more second rules that identify one or more users the first user identifier is permitted to take custody from, (iii) one or more third rules that that identify how to permit assignment of tracking codes that are associated with a grouping, (iv) one or more fourth rules that identify how to permit assignment of tracking codes that have been associated with assets, or (v) one or more fifth rules that identify if reassignments must be authorized by a prior user.

5. The computer system of claim 1, wherein the management service includes a plurality of computing devices.

6. The computer system of claim 1, wherein the one or more data records are part of a custody chain for the tracking code and the article.

7. The computer system of claim 6, wherein the custody chain tracks user identifiers that have possessed or interacted with the article.

8. The computer system of claim 6, wherein the custody chain tracks lifecycle of the article beginning with imprinting of the tracking code on the article.

9. The computer system of claim 1, wherein first computing device decrypts the tracking code from an encrypted machine-readable identifier.

10. A method, implemented at a first computing device that includes one or more processors, the method comprising:
sending, to a management service, one or more first messages including a first user identifier associated with the first computing device and a tracking code that is physically imprinted on an article, wherein the management service includes one or more data records indicating that a second user identifier associated with a second computing device has custody of the tracking code, and that the first user is permitted to take custody of the tracking code, and wherein the one or more first messages cause the management service to determine that the first user is permitted to take custody of the tracking code and to update the one or more data records to assign custody of the tracking code to the first user identifier;
based on sending the first user identifier and the tracking code to the management service:
receiving, from the management service, one or more second messages indicating that the first user identifier has been assigned custody of the tracking code; and displaying an indication that the first user identifier has custody of the article onto which the tracking code has been imprinted; and wherein the first computing devices sending the first user identifier and the tracking code to the management service also causes the second computing device to receive, from the management service, one or more third messages indicating that custody of the tracking code has been reassigned to the first user identifier, and display an indication that custody of the article onto which the tracking code has been imprinted has been reassigned from the second user identifier to the first user identifier.

11. The method of claim 10, wherein updating the one or more data records to assign custody of the tracking code to the first user identifier comprises adding one or more data records to a custody chain.

12. The method of claim 10, wherein the tracking code corresponds to a grouping article that corresponds to a plurality of other articles, and wherein updating the one or more data records to assign custody of the tracking code to the first user identifier comprises assigning a plurality of tracking codes that each corresponds to one of the plurality of other articles to the first user identifier.

13. The method of claim 10, wherein the management service includes a plurality of computing devices.

14. The method of claim 10, wherein the one or more data records are part of a custody chain for the tracking code and the article.

15. The method of claim 14, wherein the custody chain tracks user identifiers that have possessed or interacted with the article.

16. The method of claim 14, wherein the custody chain tracks lifecycle of the article beginning with imprinting of the tracking code on the article.

17. The method of claim 10, wherein first computing device decrypts the tracking code from an encrypted machine-readable identifier.

18. A computer program product comprising one or more hardware storage devices having stored thereon computer executable instructions that are executable by one or more processors to cause a first computing device to:

send, to a management service, one or more first messages including a first user identifier associated with the first computing device and a tracking code that is physically imprinted on an article, wherein the management service includes one or more data records indicating that a second user identifier associated with a second computing device has custody of the tracking code, and that the first user is permitted to take custody of the tracking code, and wherein the one or more first messages cause the management service to determine that the first user is permitted to take custody of the tracking code and to update the one or more data records to assign custody of the tracking code to the first user identifier;

based on sending the first user identifier and the tracking code to the management service:
 receive, from the management service, one or more second messages indicating that the first user identifier has been assigned custody of the tracking code; and
 display an indication that the first user identifier has custody of the article onto which the tracking code has been imprinted; and wherein the first computing devices sending the first user identifier and the tracking code to the management service also causes the second computing device to receive, from the management service, one or more third messages indicating that custody of the tracking code has been reassigned to the first user identifier, and display an indication that custody of the article onto which the tracking code has been imprinted has been reassigned from the second user identifier to the first user identifier.

\* \* \* \* \*